United States Patent [19]

Evans

[11] Patent Number: 5,141,339
[45] Date of Patent: Aug. 25, 1992

[54] BRAKE SHAFT BEARING ASSEMBLIES

[75] Inventor: Terence A. Evans, Newark, England

[73] Assignee: RHP Bearings Limited, United Kingdom

[21] Appl. No.: 533,366

[22] Filed: Jun. 5, 1990

[30] Foreign Application Priority Data

Jun. 12, 1989 [GB] United Kingdom ............ 891347

[51] Int. Cl.⁵ ................................. F16C 33/74
[52] U.S. Cl. .................... 384/130; 384/138; 384/147
[58] Field of Search .......... 384/130, 138, 139, 140, 384/143, 147, 148, 151, 152, 153, 486

[56] References Cited

U.S. PATENT DOCUMENTS

| | | | |
|---|---|---|---|
| 2,892,662 | 6/1959 | Scheel | 384/151 |
| 2,981,573 | 4/1961 | Reuter | 384/138 |
| 3,076,683 | 2/1963 | Hanley | 384/152 |
| 3,129,985 | 4/1964 | Watson | 384/486 |
| 3,955,859 | 5/1976 | Stella et al. | 384/486 X |
| 4,252,385 | 2/1981 | Leitzel | 384/138 |
| 4,701,061 | 10/1987 | Stubbersfield | 384/560 X |
| 4,809,960 | 3/1989 | Kakimoto | 384/147 X |

Primary Examiner—Thomas R. Hannon
Attorney, Agent, or Firm—Samuels, Gauthier & Stevens

[57] ABSTRACT

A brake shaft of a vehicle is rotatably supported in a housing by a pair of bush assemblies acting as plain bearings. Each bush assembly is composed of a cylindrical body with grooves in its inner periphery which open to one end of the body. The housing has a bore for introducing lubricant into the grooves. A flange at the opposite end of each body has a recess in which a multi-lip seal is fitted. The housing has recesses which receive the flanges, of the bodies and deformable lips on the bodies locate in the recesses and assist the seals to prevent the ingress of contaminants.

15 Claims, 3 Drawing Sheets

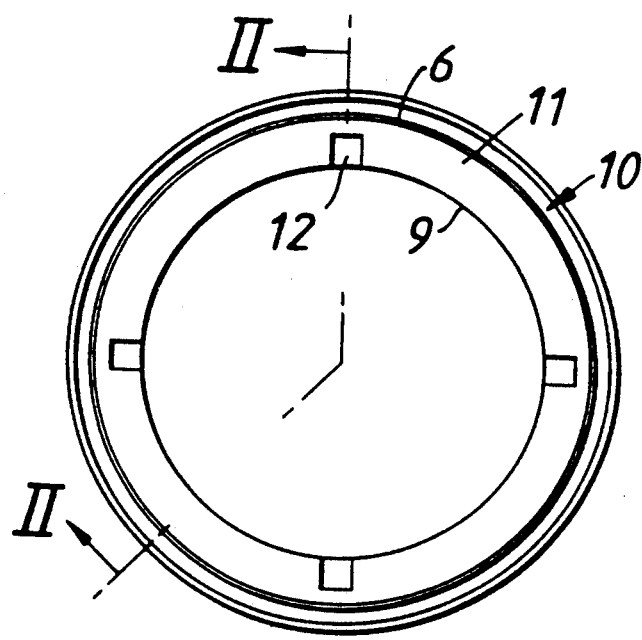
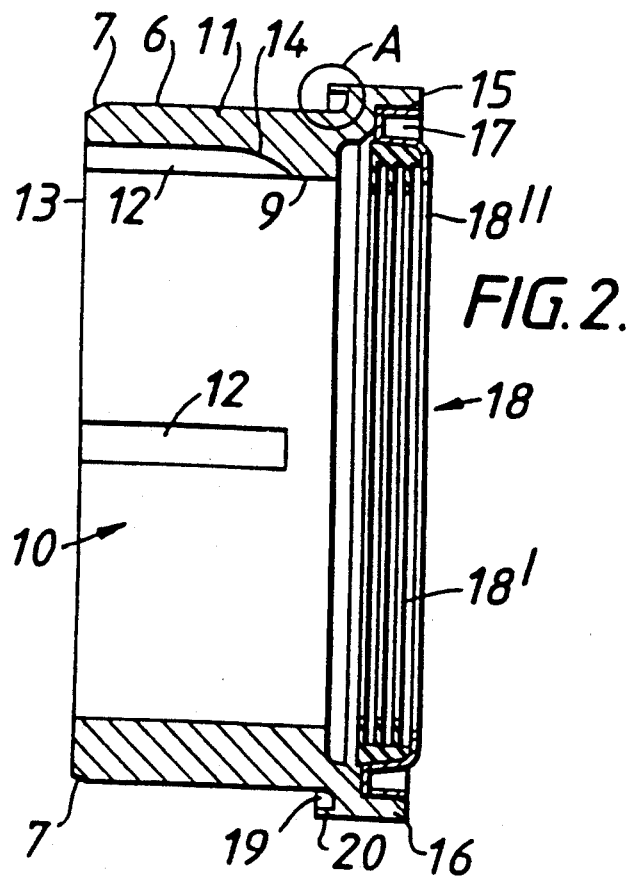
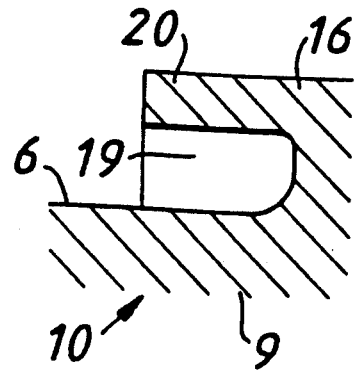

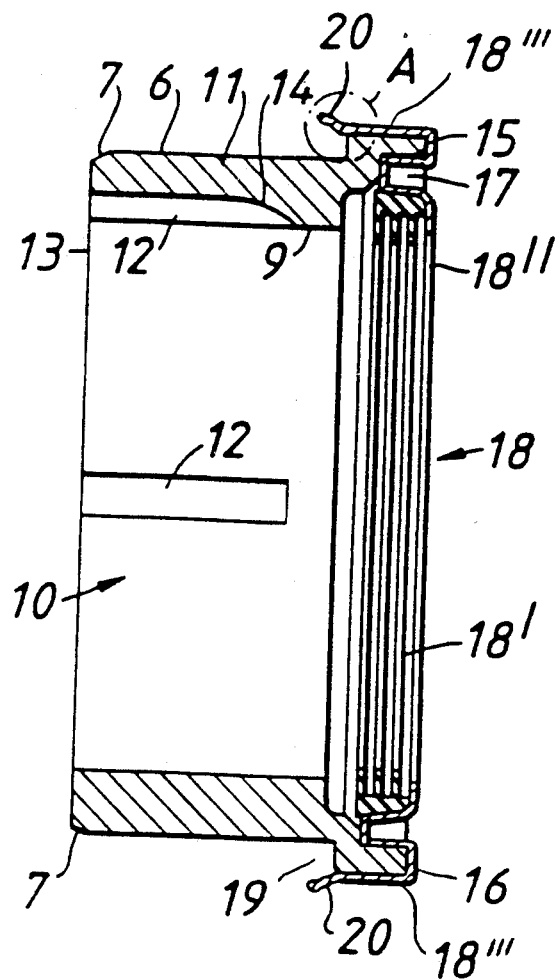
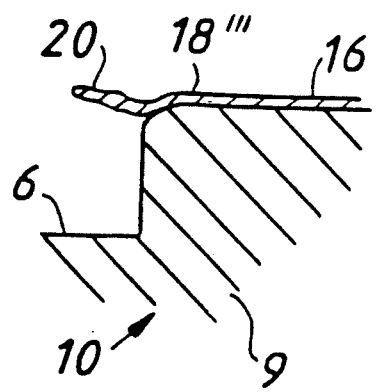
FIG. 6
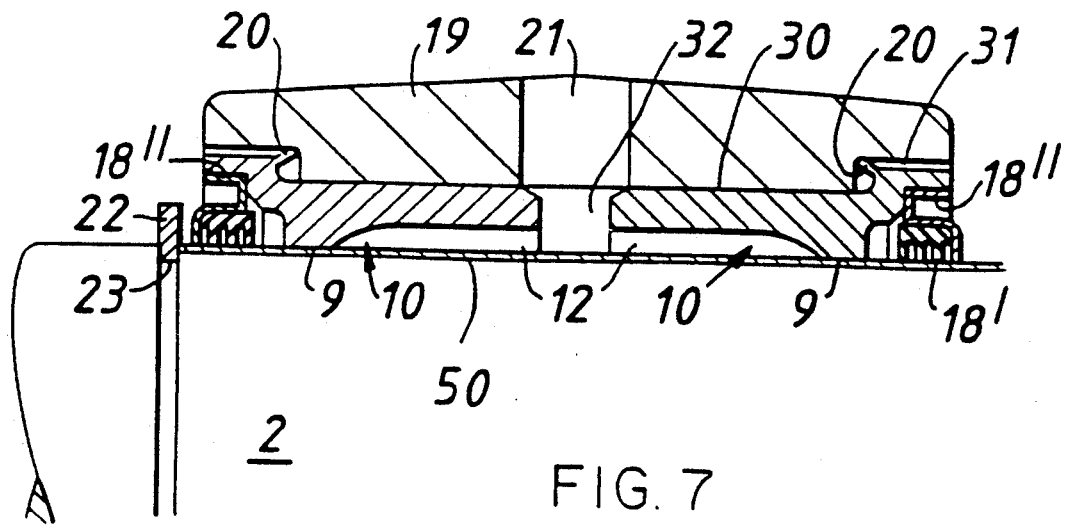
FIG. 7

BRAKE SHAFT BEARING ASSEMBLIES

FIELD OF THE INVENTION

The present invention relates in general to plain bearing assemblies for use with brake shafts of vehicles particularly trailers and semi-trailers.

BACKGROUND TO THE INVENTION

Brakes of certain vehicles are operated by a so-called 'S' cam which is displaced by a brake shaft. The brake shaft is normally supported by nylon bushes acting as plain bearings. Where these conventional bushes are to be replaced after wear the task involves removal of the vehicle wheels and disassembly of the drum brakes to provide proper access to the bushes. In harsh environments the bushes need frequent replacement since the bearing surfaces undergo premature wear due to the ingress of contaminants and the high radial applied load due to heavy braking.

GB 2 195 151A describes an assembly which acts as a sealed roller bearing assembly for replacing the conventional plain bearing bushes. This known assembly is complex and costly and there is a need for a simpler design which reverts back to plain bearings.

SUMMARY OF THE INVENTION

In one aspect the present invention provides a bush assembly intended for use as a plain bearing in supporting a brake cam shaft in a housing, the bush assembly comprising a bush body and a multi-lip seal, the bush body having a series of blind grooves on its inner surface open to one end of the body for storing lubricant.

The invention also provides a plain bearing composed of a pair of such bush assemblies mounted back-to-back with the seals on the outside of the housing. Lubricant can be introduced via the housing directly into the grooves which feed lubricant to the plain bearing surfaces.

Preferably the seal, which may be a triple lip seal bonded to a mounting plate, is fitted into a recess at an outer end of the bush body remote from the end where lubricant enters the grooves.

An external deformable lip formed on the body around the recess can be provided to locate within a recess in the housing and prevent the ingress of contaminants along the exterior of the bush body. Alternatively, the deformable lip may be bonded to an extended part of the seal mounting plate which engages around the external periphery of the bush body.

The multi-lip seal and the bush body are conveniently fabricated from engineering polymers.

In another aspect the present invention provides a bush assembly intended for use as a plain bearing in supporting a brake cam shaft in a housing; the bush assembly comprising a bush body and a multi-lip seal, the bush body having an additional external lip seal for engaging with the housing and preventing contaminants passing along the outer surface of the bush body.

Further according to the invention, a brake shaft is rotatably supported in a bore of a housing by a pair of bushes providing plain bearings, the bushes having an interference fit with the housing bore and being spaced apart at adjacent inner ends to create a chamber for receiving lubricant; wherein:

i) the bushes have grooves on their inner peripheral bearing surfaces into which the lubricant passes;

ii) multi-lip seals engage on the shaft and are fitted to the outer ends of the bushes with press-fitted mounting plates to resist the ingress of contaminants to the bearing surfaces; and iii) external lip seals engage in recesses in the housing to resist the ingress of contaminants via the housing bore. The external lip seals may also assist in axial location of the bushes during assembly.

In contrast to prior designs the bush assemblies and bearings of the invention are characterized by their simple yet effective design.

BRIEF DESCRIPTION OF DRAWINGS

The invention may be understood more readily, and various other features of the invention may become apparent, from consideration of the following description.

An embodiment of the invention will now be described, by way of example only, with reference to the accompanying drawings, wherein:

FIG. 1 is an end view of a bearing bush assembly constructed in accordance with the invention;

FIG. 2 is a sectional view of the bush assebly taken along the line II—II of FIG. 1;

FIG. 3 is an enlarged detail view of part of the bush assembly shown in FIG. 2 at 'A';

FIG. 5 is a sectional view corresponding to FIG. 2 but showing a modified bush assembly;

FIG. 6 is an enlarged detail view of part of the bush assembly shown in FIG. 5 at "A"; and FIG. 7 is a part-sectional side view corresponding to FIG. 4 but showing another modified construction.

DESCRIPTION OF PREFERRED EMBODIMENT

Figure 4:
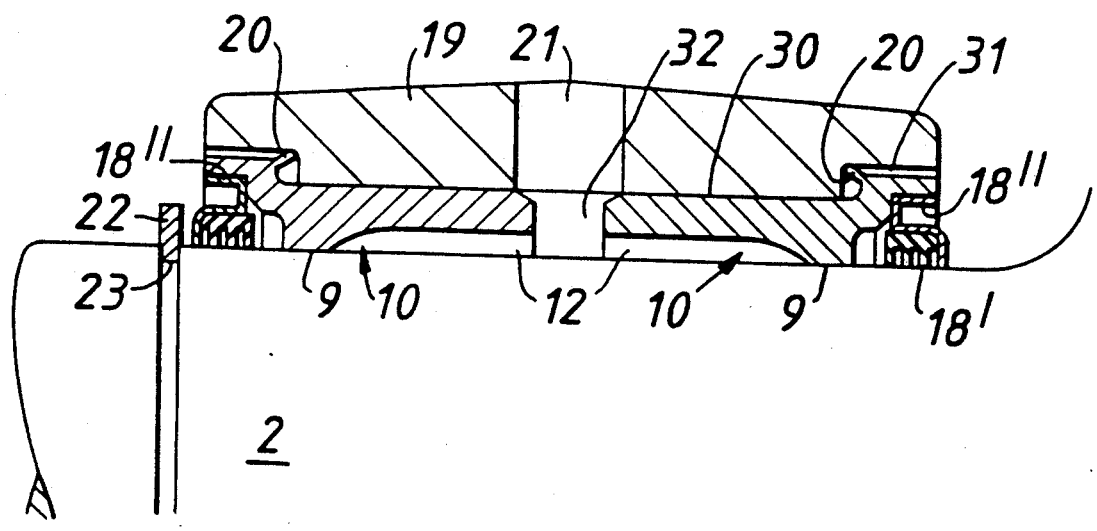
FIG. 4 is a part-sectional side view of part of a brake shaft assembly employing bearing bush assemblies in accordance with the invention.

As shown in FIGS. 1 and 2, a bearing bush assembly 10 constructed in accordance with the invention has a cylindrical main body 11. A plurality of blind grooves 12, e.g. four as shown, are provided in the inner peripheral surface 9 of the body 11. Each groove 12 is open to one end face 13 (i.e. an inner end face) of the body 11 and terminates with a curved wall surface 14 inwardly of the opposite end face 15 (an outer end face) of the body 11. A small chamfer 7 is provided between the end face 13 and the main outer peripheral surface 6 of the body 11. The body 11 has a flange 16 at the outer end region which is offset outwardly from the outer peripheral surface 6 of the body 11. The flange 16 defines a stepped recess 17 into which a resilient seal 18 is fitted. The seal 18 takes the form of a triple lip seal 18' bonded to an annular mounting plate 18". The support plate 18" is press fitted to an axial surface of the recess 17.

As shown in FIG. 3 the flange 16 is relieved at its inner under surface with a recess 19 to provide an external resilient sealing lip 20. In a modified construction depicted in FIGS. 5 and 6 the sealing lip 20 is not provided on the body 11 but instead is bonded or otherwise fixed to an extended portion 18 of the mounting plate 18" which is shaped to engage around the end surface 15 and around the external surfaces of the flange 16.

Conveniently the body 11 is filled polyamide 66 while the seal 18' is a nitrile rubber and the plate 18" is a mild steel pressing.

As shown in FIG. 4 a pair of bush assemblies 10 as described provide plain bearings supporting a brake shaft 2. The bush assemblies 10 fit into a bore 30 of a standard bearing housing 19. This standard housing 19 has recesses 31 at its ends into which the flanges 16 of the bodies 11 fit. The bush assemblies 10 are urged into the housing 19 from the opposite ends of the housing 19 to form an interference fit between the bore 30 and the outer peripheral surfaces 6 of the bodies 11 until the lips 20 abut on end faces of the recesses 31 and undergo deformation. With the bushes 10 thus fitted a chamber 32 is created between the inner end faces 13 of the bodies 11. This chamber 32 establishes communication between the grooves 12 and an access hole 21 which is provided in the housing 19. This permit grease to be introduced via a grease nipple (not shown) into the hole 21 and the chamber 32 and thence between the shaft 20 and the inner peripheral bearing surfaces 9 of the bush bodies 11 and the seals 18. The grease fills the grooves 12 which acts to store the grease.

The seals 18 primarily serve to prevent contaminants passing to the bearing surfaces.

The outer lips 20 of the bush assemblies 10 are resiliently deformable and prevent contaminants passing between the housing 19 and the outer peripheral surfaces 6 of the bodies 11 to reach the lubricant access hole 21 and the chamber 32.

A circlip 22 received in a groove 23 in the shaft 2 retains the bush assemblies 10 in the housing 19.

When fitting the bush assemblies 10 to the shaft 2 in situ it is useful to pre-treat the peripheral surface of the shaft 2. In general, the pre-treatment provides at least one continuous clean layer with a surface of low friction over the peripheral surface of the shaft 2 somewhat longer than the two bush assemblies 10. In practice, a pre-formed sheet of PTFE of uniform thickness with an adhesive coating is applied to the peripheral surface of the shaft 2 after cleaning to provide the low friction. This is represented in FIG. 7 where the sheet is designated 50 layer.

I claim:

1. A bush assembly intended for use as a plain bearing in supporting a brake cam shaft in a housing; said assembly comprising a bush body with first and second ends and outer and inner peripheral surfaces, a series of blind grooves on said inner peripheral surface of the bush body open at a first end of the body for storing lubricant, an external resiliently deformable lip seal directed predominantly axially of the bush body and formed integrally with the second end thereof for location in a recess of the housing to prevent the ingress of contaminants along the exterior of the bush body and a further multi-lip seal at the second end of the bush body for sealing the inner peripheral surface of the bush body.

2. A bush assembly according to claim 1, wherein the further seal is a triple-lip seal.

3. A bush assembly according to claim 1, wherein the further seal is bonded to a mounting plate.

4. A bush assembly according to claim 3, wherein the mounting plate is received in a recess at said second end of the bush body.

5. A bush assembly according to claim 4, wherein the bush body has a flange at said second end and the recess is provided within the flange.

6. A bush assembly according to claim 5, wherein the flange is offset from said outer peripheral surface of the bush body.

7. A bush assembly according to claim 1, wherein the multi-lip seal is made from a nitrile rubber.

8. A bush assembly according to claim 1, wherein the bush body is made from a filled polyamide.

9. A bush assembly according to claim 1, wherein the bush body has a chamfered region between its outer peripheral surface and said further seal.

10. A bush assembly according to claim 1, wherein the bush body is relieved with a recess to provide the lip seal.

11. In combination: a brake shaft rotatably supported in a bore of a housing by a pair of bushes providing plain bearings, means providing an interference fit between the bushes and the housing bore, the bushes being spaced apart at adjacent inner ends to create a chamber for receiving lubricant; wherein;
   i) the bushes have grooves on inner peripheral bearing surfaces into which the lubricant passes;
   ii) multi-lip seals engage on the shaft and are fitted to the outermost ends of the bushes with pressfitted mounting plates to resist the ingress of contaminants to the bearing surfaces; and
   iii) external lip seals formed integrally with the bushes to extend predominantly axially thereof engage in recesses in the housing to locate the bushes in position and resist the ingress of contaminants via the housing bore.

12. The combination according to claim 11, wherein the external lip seals locate the bushes during assembly.

13. The combination of claim 11, wherein the bushes contact a layer of low frictional material fitted onto the peripheral surface of the shaft.

14. A bush assembly intended for use as a plain bearing in supporting a brake cam shaft in a housing: said assembly comprising a bush body with first and second ends and outer and inner peripheral surfaces, a series of blind grooves on said inner peripheral surface of the bush body open at a first end of the body for storing lubricant and a multi-lip seal at the second end of the bush body for sealing the inner peripheral surface of the bush body, wherein the seal is bonded to a mounting plate and an external deformable lip is fixed to the mounting plate for location in a recess in the housing to prevent the ingress of contaminants along the exterior of the bush body.

15. A bush assembly intended for use as a plain bearing in supporting a brake cam shaft in a housing; said assembly comprising a bush body with first and second ends and outer and inner peripheral surfaces, a series of blind grooves on said inner peripheral surface of the bush body open at a first end of the body for storing lubricant and a multi-lip seal at a second end of the bush body for sealing the inner peripheral surface of the bush body, wherein the seal is bonded to a mounting plate, the mounting plate is received in a recess at a said second end of the bush body, the bush body has a flange at said second end which is offset from the outer peripheral surface of the bush body, the recess is provided within the flange and the flange is relieved with a recess to provide a resilient lip seal for location in a recess in the housing to prevent the ingress of contaminants along the exterior of the bush body.

* * * * *